United States Patent [19]

Albright

[11] Patent Number: 5,069,362
[45] Date of Patent: Dec. 3, 1991

[54] ESCAPEMENT MANIFOLD FOR FASTENER FEEDING MACHINES AND THE LIKE

[75] Inventor: Clare E. Albright, Grayling, Mich.

[73] Assignee: Air Way Automation, Inc., Grayling, Mich.

[21] Appl. No.: 518,020

[22] Filed: May 2, 1990

[51] Int. Cl.$^5$ .............................................. B65G 59/00
[52] U.S. Cl. ...................................... 221/131; 221/258; 221/268; 221/312 R; 221/278; 221/264; 403/380; 285/325
[58] Field of Search ............... 221/258, 278, 264, 131, 221/312 R; 385/325, 326, 327; 403/380, 362, 373

[56] References Cited

U.S. PATENT DOCUMENTS

| | | | |
|---|---|---|---|
| 2,124,748 | 7/1938 | Ransom | 403/362 |
| 3,297,199 | 1/1967 | Law | 221/268 |
| 3,365,215 | 1/1968 | Arzt et al. | 285/325 |
| 3,540,622 | 11/1970 | Spisak | 221/233 |
| 3,554,403 | 1/1971 | Ginther | 221/278 |
| 3,955,828 | 5/1976 | Boudreay | 403/362 |
| 4,278,184 | 7/1981 | Willis | 221/278 |
| 4,830,547 | 5/1989 | Boob et al. | 221/233 |

Primary Examiner—H. Grant Skaggs
Attorney, Agent, or Firm—Price, Heneveld, Cooper, DeWitt & Litton

[57] ABSTRACT

A fastener feeding machine is provided with a plurality of fluid powered escapements for selecting and delivering fasteners in a predetermined sequence and orientation. The fastener feeding machine includes a manifold body with individual mounting stations at which the escapements are positioned. The manifold body includes a plurality of ports located at the mounting stations to communicate with the escapements and thereby provide for control of the escapements through a central pressurized fluid supply. An escapement mounting arrangement on the manifold body allows for quick detachment of the individual escapements, and simultaneous sealing of individual ports upon re-attachment.

32 Claims, 4 Drawing Sheets

ESCAPEMENT MANIFOLD FOR FASTENER FEEDING MACHINES AND THE LIKE

BACKGROUND OF THE INVENTION

This invention relates to fastener delivery systems, and more particularly to a manifold arrangement therefor.

Considerable assembly time may be saved by utilizing automatic delivery of fasteners to multispindle machines for assembly where multiple fasteners, such as bolts or screws, are required. Machines which perform this function and deliver fasteners are often called "feeder machines". These machines typically have multiple escapements or bolt meters that select the individual fasteners for transport. These escapements are particularly susceptible to breakdown since they are comprised of numerous fast-moving parts, and handle fasteners which are often not consistent in size and shape. Thus, the ability to quickly and efficiently repair these escapements is vitally important.

Heretofore, industry practice has been to individually mount escapements. This arrangement reduces replacement inventory by allowing for escapements which are identical in shape and design. However, this method is cumbersome and results in additional holding structure. Additionally, multiple bolts need to be removed for disassembly.

It has been the practice of some competitors in the industry, most particularly Air Way Automation, Inc. of Grayling, Mich., to utilize a type of piggy-back design, with multiple escapements mounted on tie rods in series. This design, however, suffers from a multitude of problems. For example, when one of the escapements fails, or otherwise requires maintenance, the whole escapement assembly must often be disassembled to repair the single escapement. Thus the associated feeder machine necessarily must be shut down for a period of time to allow for this type of time consuming repair. This includes disconnecting and re-connecting all associated pressure lines. Also, the escapement assembly tends to be difficult to re-assemble given the multitude of "O"-rings which seal the air flow between the various escapements. Further, these "O"-rings tend to be easily misplaced, or knocked out of position. Also, extra care must be taken to uniformly tighten the tie rods with proper and balanced tension to prevent air leaks between the escapement, and other related mechanical problems. Further, the repair and reassembly of the escapement assembly typically must be performed off-site from the machines. This leads to additional problems of wasted time, wasted space, and related inefficiencies.

SUMMARY OF THE INVENTION

One aspect of the present invention is to provide an improved manifold which is adapted to support and supply pressurized fluid to escapement mounted thereon. The manifold includes a manifold body which has a plurality of mounting stations and a central fluid supply passageway operably connected to a source of pressurized fluid. A plurality of manifold ports communicate with the centra passageway and selectively communicate with the power port of an associated escapement to convey pressurized fluid to the escapement. Fluid seals are positioned about the manifold ports to form leak-resistent seals between the manifold body and each of the associated escapements. The escapements are detachably mounted on the manifold and, upon attachment, are automatically aligned thereon, such that the power port of the escapement is properly positioned over the manifold port conveying pressurized fluid.

Another aspect of the present invention provides for a fastener feeder machine having a plurality of escapements mounted on an escapement manifold in a side-by-side relationship. A quick-disconnect arrangement quickly yet securely mounts the escapements on the manifold, and comprises a tongue and groove arrangement, with a single fastener, and allows each escapement to be individually detached and re-attached to the manifold.

The principal objects of the present invention are to provide an improved manifold arrangement that is more quickly and efficiently repairable. The manifold provides a centralized system of fluid supply that is more efficient, and need not be completely disassembled for repair or replacement of selected escapements. Also, the manifold provides for individual attachment of escapements. Further, the escapements can be mounted in a quick-disconnect arrangement.

These and other features, advantages and objects of the present invention will be further understood and appreciated by those skilled in the art by reference to the following specifications, claims, and appended drawings.

DETAILED DESCRIPTION OF THE PREFERRED EMBODIMENT

Figure 1:
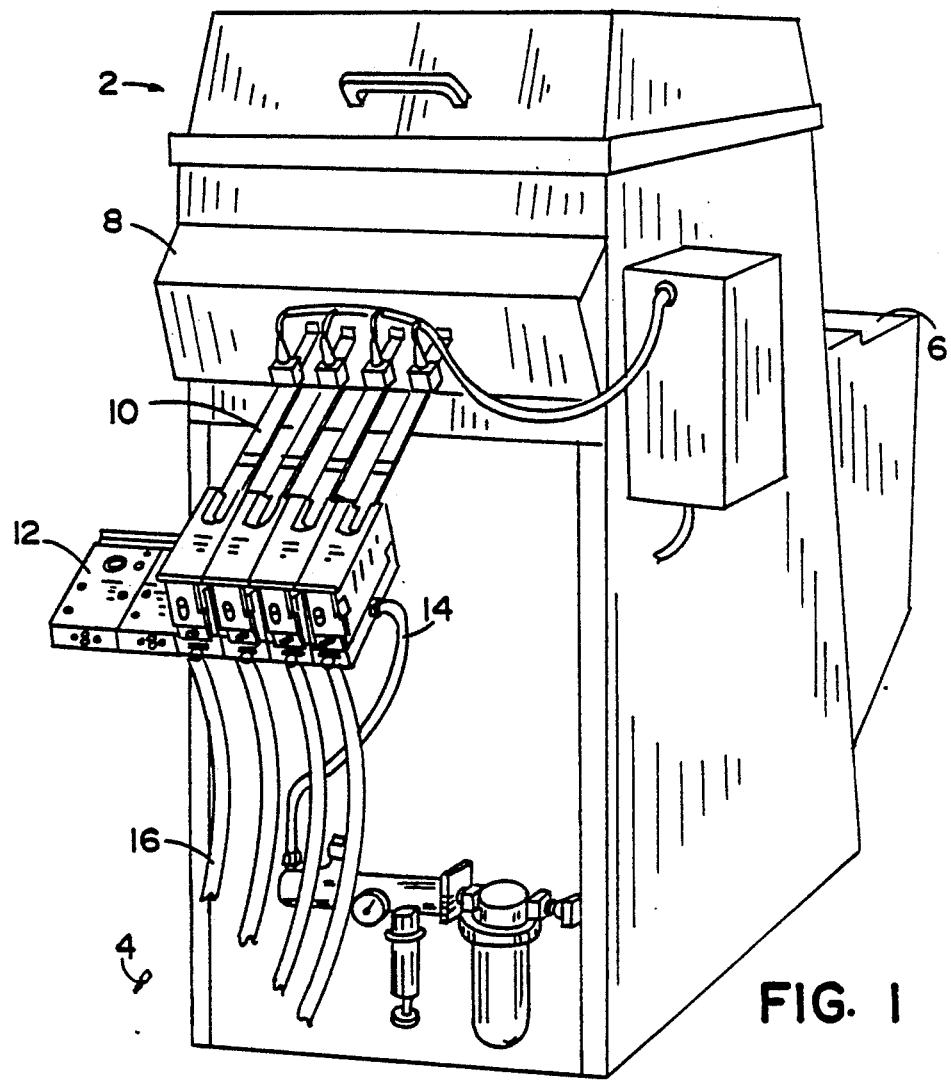
FIG. 1 is an isometric view of a pneumatic feeder machine with an escapement manifold arrangement embodying the present invention.
Figure 4:
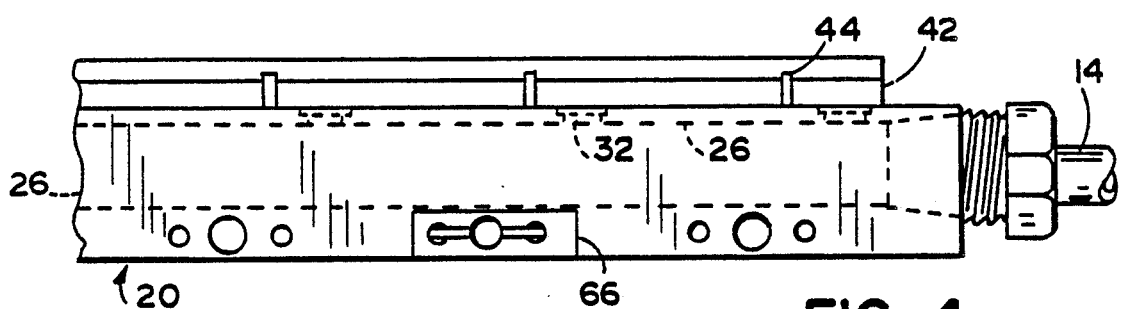
FIG. 4 is a front elevational view of the manifold body.
Figure 5:
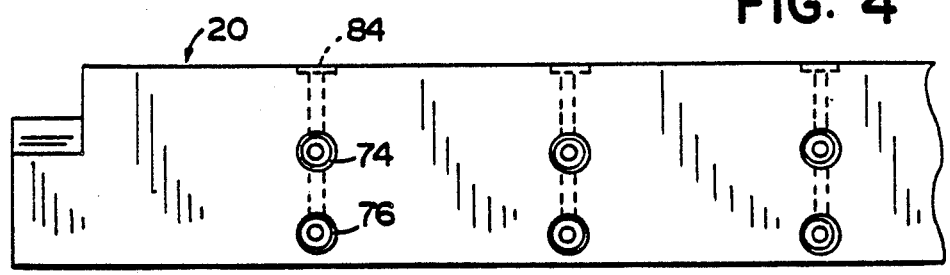
FIG. 5 is a rear elevational view of the manifold body.

For purposes of the description herein, the terms "upper", "lower", "right", "left", "rear", "front", "vertical", "horizontal", and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference number 2 (FIG. 1) generally designates a fastener feeding machine incorporating the present invention. Fastener feeding machine 2 is provided with a plurality of fluid powered escapements 22 for selecting and delivering fasteners 4 in a predetermined sequence and orientation. Fastener feeder machine 2 includes a manifold body 20 with individual mounting stations 38 at which escapements 22 are positioned. Manifold body 20 includes a plurality of ports—located at the mounting stations 38, and thereby provide for control of the escapements 22 through a central pressurized fluid supply passageway 26. An escapement mounting arrangement on the manifold body 20 allows for quick detachment of the individual escapements 22, and simultaneous sealing of individual ports upon re-attachment.

Figure 2:
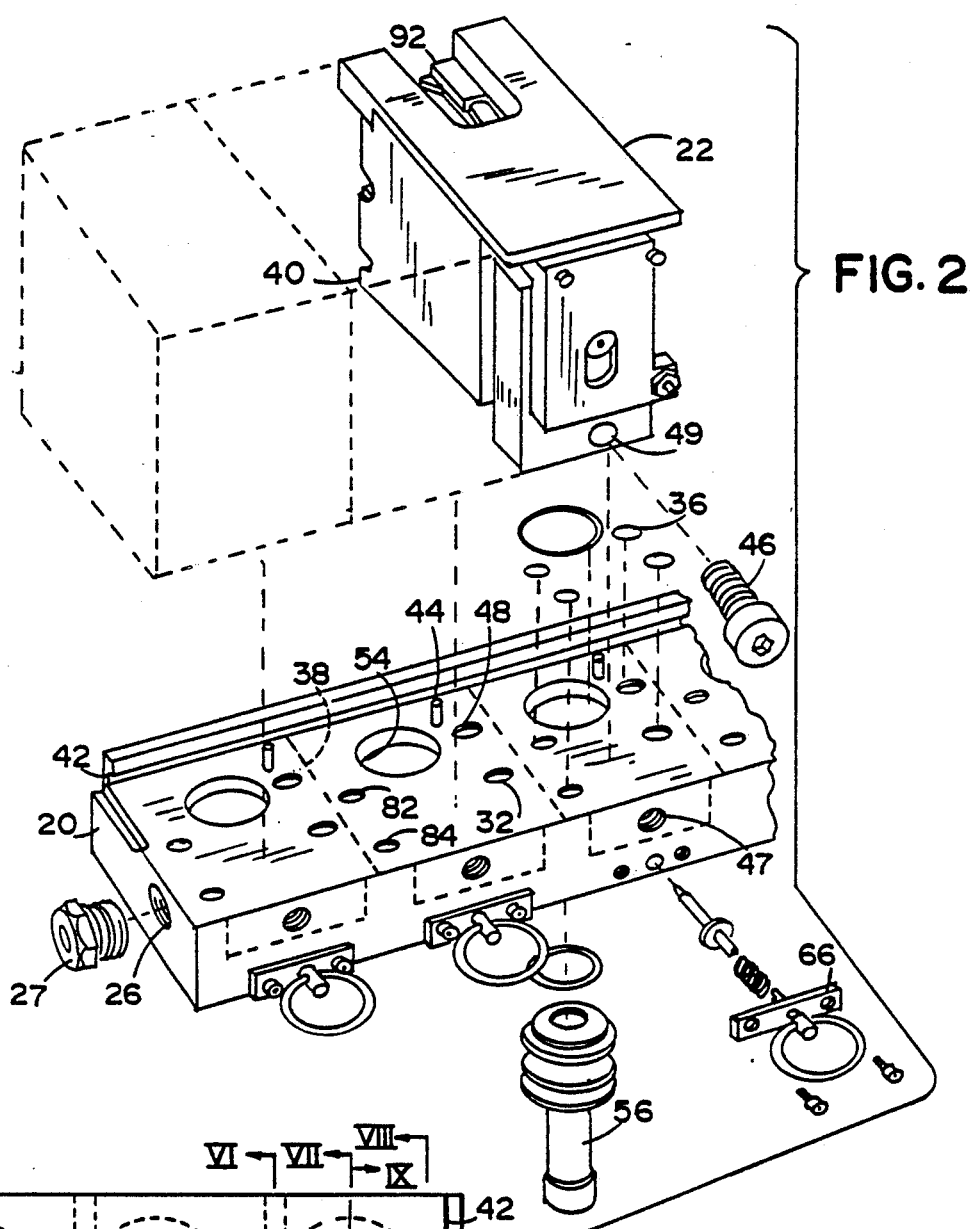
FIG. 2 is an exploded isometric view of the escapement manifold arrangement showing a manifold body, and one associated escapement.

Referring to FIGS. 1 and 2, the reference numeral 2 designates an automatic fastener feeder machine designed to deliver individual fasteners 4 to a selected workstation in a predetermined sequence and orientation. Machine 2 consists of an input hopper 6 for fasteners, a fastener loading mechanism 8, multiple feeder tracks 10, a manifold 12, a pressurized fluid supply 14, and a fastener delivery system 16. As will be explained hereinafter, machine 2 is adapted to take loose fasteners 4 dumped into hopper 6, and load them through load mechanism 8 for presentment through feeder tracks 10 to manifold 12. Manifold 12 then sequentially selects an individual fastener 4 from a column of fasteners 4 in an associated feeder track 10, and releases it to the fastener delivery system 16 for distribution.

While the illustrated feeder machine 2 is specifically adapted to select and handle fasteners 4, it is to be understood that the present invention is also applicable to the handling of other types of discrete elements, and also useful in different environments, as would be appreciated by those skilled in the art.

Escapement 22 (FIG. 2) is a device used in the trade to sequentially select and deliver fasteners 4 or the like to a fastener delivery system 16. The illustrated escapements 22 consist of a fastener entry opening 92, an internal mechanism to sequentially select and release fasteners, an exit tube 54, a controller and power device, and associated structure for receiving control and power. In the illustrated embodiment of the present invention, escapement 22 is pneumatic or air driven and is constructed to cooperate with and communicate with manifold body 20 and its related components, such as inlet power ports 32, return power port 48, control ports 82 and 84, and exit tube 54.

Referring more specifically to the details of manifold 12, as briefly described above and shown in FIGS. 1, 2, and 3, manifold 12 includes a ported manifold body 20, at least one escapement or bolt meter 22, seals 36, and assorted accessories parts including plug 27, exit tube 56, tube retension assembly 66, and bolt 46 as discussed in detail below.

Manifold body 20, as shown in FIG. 2, includes a central fluid supply passageway 26, which passes centrally therethrough. Supply passageway 26 is connected at one end to a pressurized fluid supply 14, and is plugged at the other end by a plug 27, thus allowing central passageway 26 to retain pressurized fluid. In one embodiment of the present invention, this pressurized fluid is pneumatic or compressed air.

Manifold body 20 has multiple mounting stations 38 for detachably mounting one or more escapements 22 in a side-by-side relationship. In the illustrated example, a tongue and groove mounting arrangement is provided, wherein manifold body 20 has a groove 42 and threaded retaining hole 47. Escapement 22 includes a tongue 40, and a retaining hole 49 through which retaining bolt 46 fastens. Manifold body 20 also has a locator pin 44 which properly aligns escapement 22 on station 38 by slidably engaging a mating slot 45 in tongue 40 of escapement 22, slot 45 being shown in FIGS. 10 and 11.

Figure 8:
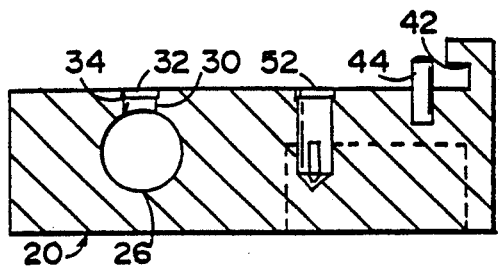
FIG. 8 is a vertical cross sectional view of the manifold body, taken along the line VIII—VIII of FIG. 3, and showing the delivery air porting.
Figure 9:
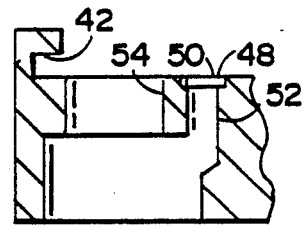
FIG. 9 is a fragmentary vertical elevational cross sectional view of the manifold body, taken along the line IX—IC of FIG. 3, and showing the delivery air porting into a main exit tube.

Pressurized fluid is communicated from central passageway 26 through passageway 30 and inlet port 32 at each mounting station to an associated port on escapement 22, as shown in FIG. 8. Manifold body 20 also receives pressurized fluid back from escapement 22, and conveys fluid to fastener delivery system 16. FIG. 9 shows a return power port 48, a sealing surface 50 for holding a fluid seal such as seal element 36, and a passageway 52 which is constructed to accomplish this function. Passageway 52 conveys pressurized fluid into exit tube 54, thus providing power to convey fastener 4 from the exit tube 54 into and through fastener delivery system 16.

Figure 3:
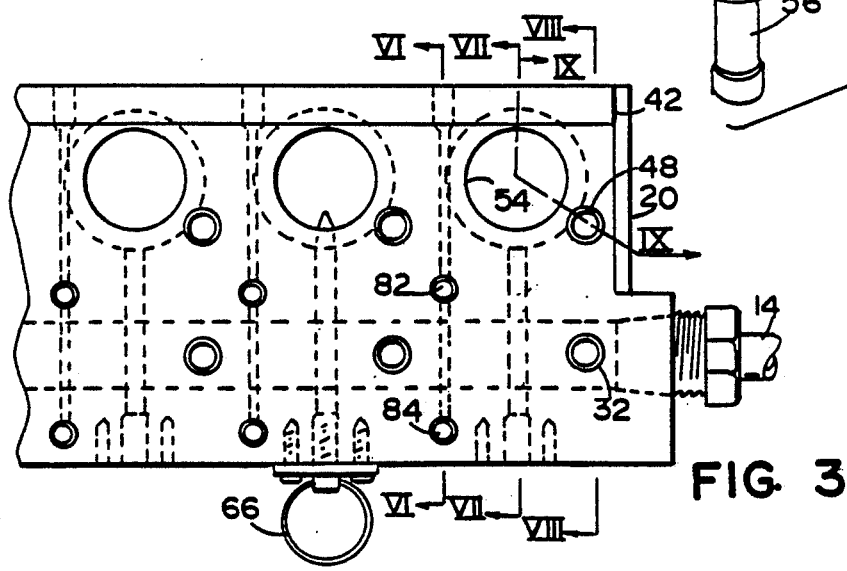
FIG. 3 is a top plan view of the manifold body.
Figure 7:
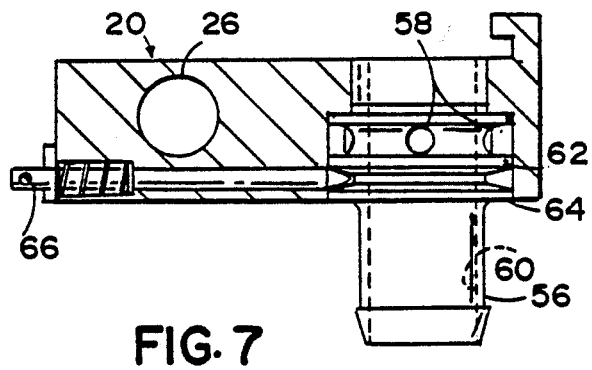
FIG. 7 is a vertical cross sectional view of the manifold body, taken along the line VII—VII of FIG. 3, and showing delivery air porting.

FIGS. 2, 3, and 7 show a removable exit tube nipple 56 which is removably attached to manifold body 20. Exit tube nipple 56 is designed to include access holes 58 (FIG. 7) which communicate pressurized fluid 28 from passageway 52 to the inside surface 60 of exit tube nipple 56. Nipple 56 further includes sealing ledges 62 and 64 which prevent pressurized fluid from escaping, and also allow retention assembly 66 to hold nipple 56 in place. Thus, nipple 56 may be quickly removed by pulling on retention assembly 66 and releasing nipple 56.

Figure 6:
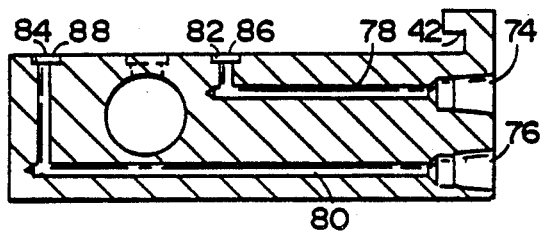
FIG. 6 is a vertical cross sectional view of the manifold body taken along the line VI—VI of FIG. 3, and showing control air porting.

Manifold body 20 is provided with ports 74 and 76, passageways 78 and 80, ports 82 and 84, and sealing surfaces 86 and 88, (FIG. 6) which permit manifold body 20 to communicate control fluid to and from associated escapements 22 thereby allowing for control of individual escapements 22. Thus, ports 82 and 84 permit quick detachment and reattachment of escapements 22 for repair without disconnecting fluid lines.

Each port of manifold body 20 is properly designed for sealing to prevent loss of pressurized fluid or control fluid. FIG. 2 shows one embodiment utilizing "O"-rings as sealing elements 36. As shown, seal elements 36 are positioned about ports 32, 48, 82 and 84 to prevent loss of pressurized fluid and increase efficiency of manifold 12. Each seal element 36 is seated in sealing surfaces 34, 50, 86 or 88, and is compressed between escapement 22 and manifold body 20.

OPERATION

Having described the parts and components of automatic fastener feeder machine 2, the operation of the same should become evident. Multiple fasteners 4 are initially dumped into input hopper 6 where individual fasteners 4 are aligned and oriented by fastener loading mechanism 8 onto feeder tracks 10. Fasteners 4 are then fed by gravity along feeder tracks 10 to fastener entry opening 92 in escapement 22. Subsequently, a control signal is received, such as though manifold body control port 76, causing escapement 22 to "cycle forward". During the "cycle forward" period, escapement 22 first closes off the top of exit tube 54 by close-off 94, and then causes pressurized fluid to flow into the fastener delivery system 16. More specifically, pressurized fluid flows from central fluid supply passageway 26, through manifold passageway 30 and port 32 into escapement 22, and then back through port 48 and passageway 52 into exit tube 54. Also during the "cycle forward" period, escapement 22 selects a new fastener 4 and readies the newly selected fastener 4 to drop into exit tube 54 upon the start of the next cycle.

After a predetermined period, a second control signal is received, such as through manifold body control port 74, causing escapement 22 to "cycle rearward". This results in escapement 22 shutting off pressurized fluid to the fastener delivery system 16, retracting close-off 94, and then in a single fastener 4 being dropped through exit tube 54 into fastener delivery system 16. Thus, feeder machine 2 is readied for a new cycle.

Figure 10:
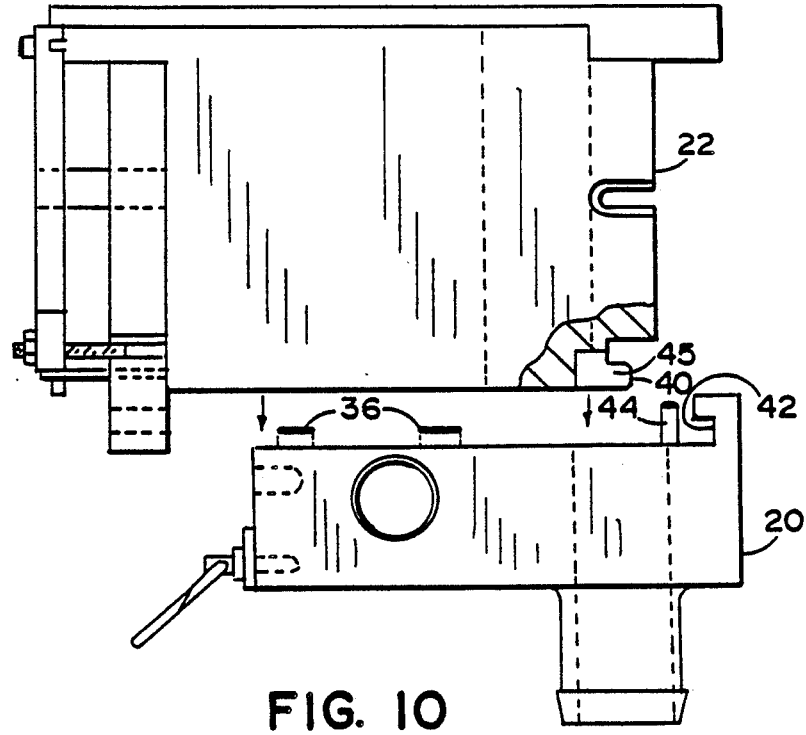
FIG. 10 is a partially schematic, side elevational view of an escapement and the manifold body shown positioned before assembly.
Figure 11:
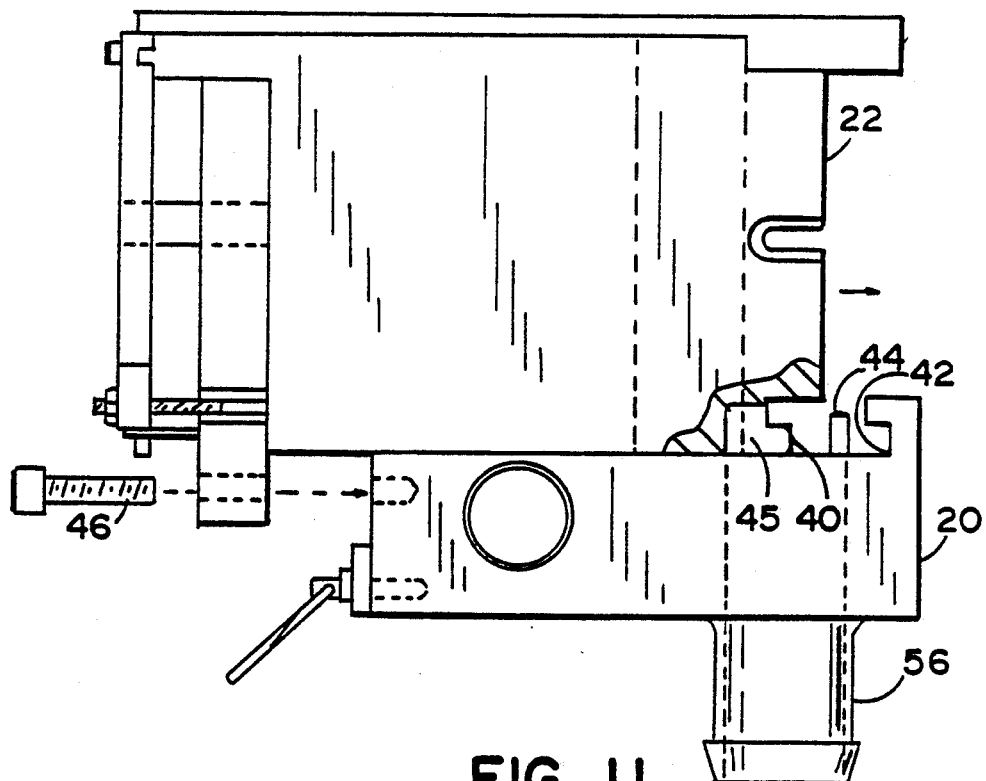
FIG. 11 is a partially schematic, side elevational view of an escapement positioned on the manifold body during assembly.
Figure 12:
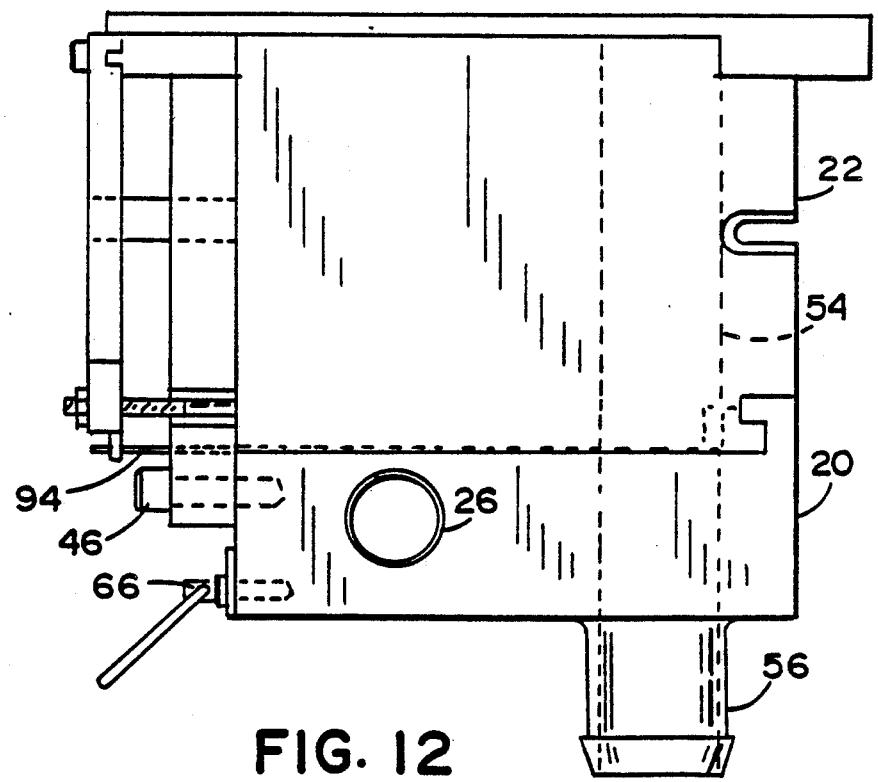
FIG. 12 is a partially schematic, side elevational view of an escapement fully assembled to the manifold body.

Of particular significance is the ease and speed of repair which manifold 12 allows. As shown in FIG. 2, manifold body 20 offers multiple mounting stations 38 for escapements 22, each having a tongue and groove arrangement allowing for detachment after removing only one retaining bolt 46 as shown pictorially in FIGS. 10, 11 and 12. FIG. 10 shows escapement 22 positioned to be assembled to manifold body 20, sealing elements 24 having already been put in place. FIG. 11 shows escapement 22 sitting on manifold body 20, ready to be pushed into its final position. FIG. 12 shows escapement 22 having been pushed forward, tongue 40 having been fully inserted into groove 42 and onto locator pin 44, retaining bolt 46 having been fully installed. In the installed position, tongue 40, groove 42, hole 49, threaded hole 47, and fastener bolt 46 cooperate to create sufficient compressive force upon sealing elements 36 to prevent undesirable loss of pressurized fluid. Thus, each escapement 22 is fully removable and replaceable by removing a single bolt 46 without disconnecting any tubes or wires from escapement 22. Further, additional escapements may be added by mounting additional escapements 22 to open mounting stations 38 in the manifold body 20.

Manifold 12 provides fastener feeder machine 2 with a system of escapements 22 for selecting and delivering fasteners 4 which is easily and quickly repairable. Manifold 12 includes a manifold body 20 which is ported and has mounting stations 38 allowing manifold body 20 to communicate with individual escapements 22. Thereby, individual escapements 22 are provided with pressurized fluid for power and are controlled. Also, mounting stations 38 have a tongue and groove arrangement allowing individual escapements 22 to be quickly detached and replaced or repaired.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which as exclusive property or privilege is claimed are defined as follows:

1. In a fastener feeding machine of the type having a plurality of fluid-powered escapements, each having an inlet power port associated therewith, and being adapted to select and deliver individual fasteners to a selected workstation in a predetermined sequence and orientation, the improvement of an escapement manifold adapted to support and supply pressurized fluid to each of said escapements, comprising:
   a manifold body having a plurality of mounting stations thereon, and a central fluid supply passageway operably communicate with a source of pressurized fluid;
   a plurality of manifold ports disposed in said manifold body, and communicating with said central passageway, with at least one of said manifold ports being positioned at each of said mounting stations for selective communication with the power port of an associated escapement;
   a plurality of fluid seals positioned about said manifold ports to form leak-resistent seals between said manifold body and each of said escapements; and
   means associated with each of said mounting stations for detachably mounting the associated escapement on said manifold body, and being configured such that physical attachment of the associated escapement to said manifold body at a selected one of said mounting stations automatically aligns the power port on said associated escapement with the manifold port at the one mounting station of said manifold body to communicate pressurized fluid therebetween, and simultaneously engages the fluid seal associated with said one mounting station to form a leak resistant seal therebetween 2. A fastener feeding machine as set forth in claim 1, wherein:
   said escapement attaching means comprises a tongue and groove arrangement at one end of each of said escapements, and a single removable fastener at an opposite end of each of said escapements, such that said escapements are mounted on said manifold body by first engaging the associated tongue and groove arrangement at the one end of said escapement, and then installing the associated fastener at opposite end of said escapement.

3. A fastener feeding machine as set forth in claim 2, wherein:
   said fluid seals are compressible; and
   said escapement attaching means converges the associated escapement and said manifold body to compress said associated fluid seal therebetween.

4. A fastener feeding machine as set forth in claim 3, wherein:
   said manifold mounting stations have a substantially identical configuration, and are arranged generally side-by-side along said manifold body.

5. A fastener feeding machine as set forth in claim 4, wherein:
   said pressurized fluid is pneumatic; and
   said manifold ports are adapted to convey pneumatic fluid.

6. A fastener feeding machine as set forth in claim 5, wherein:
   each escapement has a fastener exit tube associated therewith, configured to allow release of said fasteners; and
   a plurality of manifold tubes disposed in said manifold body, with at least one manifold tube being positioned at each of said mounting stations for selective communication with the fastener exit tube of an associated escapement.

7. A fastener feeding machine as set forth in claim 6, wherein:
said escapement has a return port associated therewith to operably return said pressurized fluid to said manifold body;
a plurality of manifold ports and passageways disposed in said manifold body to receive said return pressurized fluid from said return port of said escapement, with at least one manifold port and associated passageway being positioned at each of said mounting stations for selective communication with the return port of an associated escapement; and
said return passageway for said pressurized fluid in said manifold body being positioned such that the return pressurized fluid is communicated to said fastener delivery system.

8. A fastener feeding machine as set forth in claim 7, wherein:
said manifold body has a plurality of control fluid passageways shaped to operably communicate with a source of pressurized fluid control;
a plurality of manifold ports disposed in said manifold body and communicating with said control fluid passageways, with at least one manifold ports being positioned at each of said mounting stations for selective communication with the control port of an associated escapement.

9. A fastener feeding machine as set forth in claim 1, wherein:
said fluid seals are compressible; and
said escapement attaching means converges the associated escapement and said manifold body to compress said associated fluid seal therebetween.

10. A fastener feeding machine as set forth in claim 1, wherein:
said manifold mounting stations have a substantially identical configuration, and are attached generally side-by-side along said manifold body.

11. A fastener feeding machine as set forth in claim 1, wherein:
said pressurized fluid is pneumatic; and
said manifold ports are adapted to convey pneumatic fluid.

12. A fastener feeding machine as set forth in claim 1, wherein:
each escapement has a fastener exit tube associated therewith configured to allow release of said fasteners; and
a plurality of manifold tubes disposed in said manifold body, with at least one manifold tube being positioned at each of said mounting stations for selective communication with the fastener exit tube of a associated escapement.

13. A fastener feeding machine as set forth in claim 1, wherein:
said escapement has a return port associated therewith to operably return said pressurized fluid to said manifold body;
a plurality of manifold ports and passageways disposed in said manifold body to receive said return pressurized fluid from said return port of said escapement, with at least one manifold port and associated passageway being positioned at each of said mounting stations for selective communication with the return port of an associated escapement; and
said return passageway for said pressurized fluid in said manifold body being positioned such that the pressurized fluid is communicated to said fastener delivery system.

14. A fastener feeding machine as set forth in claim 1, wherein:
said manifold body has a plurality of control fluid passageways shaped to operably communicate with a source of pressurized fluid control;
a plurality of manifold ports disposed in said manifold body and communicating with said control fluid passageways, with at least one manifold port being positioned at each of said mounting stations for selective communication with the control port of an associated escapement.

15. A fastener feeding machine comprising:
a plurality of fluid-powered escapements, each having an inlet power port associated therewith, and being adapted to select and deliver individual fasteners to a selected workstation in a predetermined sequence and orientation;
an escapement manifold arrangement adapted to support and supply pressurized fluid to each of said escapement, including:
a manifold body having a plurality of mounting stations thereon, and a central fluid supply passageway shaped to operably communicate with a source of pressurized fluid;
a plurality of manifold ports disposed in said manifold body and communicating with said central passageway, with at least one of said manifold ports being positioned at each of said mounting stations for selective communication with the power port of an associated escapement;
a plurality of fluid seals positioned about said manifold ports, and adapted to form leak-resistant seals between said manifold body and each of said escapements; and
means associated with each of said mounting stations for detachably mounting a associated escapement on said manifold body, and being configured such that physical attachment of the associated escapement to said manifold body at a selected one of said mounting stations automatically aligns the power port on said associated escapement with the manifold port at the one mounting station of said manifold body to communicate pressurized fluid therebetween, and simultaneously engages the fluid seal associated with said one mounting station to form a leak resistant seal therebetween.

16. A fastener feeding machine as set forth in claim 15, wherein:
said escapement attaching means comprises a tongue and groove arrangement at one end of each of said escapements, and a single removable fastener at an opposite end of each of said escapements, such that said escapements are mounted on said manifold body by first engaging the associated tongue and groove arrangement at the one end of said escapement, and then installing the associated fastener at the opposite end of said escapement.

17. A fastener feeding machine as set forth in claim 15, wherein:
said fluid seals are compressible; and said escapement attaching means converges the associated escapement and said manifold body to compress said associated fluid seal therebetween.

18. A fastener feeding machine as set forth in claim 15, wherein:
said manifold mounting stations have a substantially identical configuration, and are arranged generally side-by-side along said manifold body.

19. A fastener feeding machine as set forth in claim 15, wherein:
said pressurized fluid machine is pneumatic; and
said manifold ports are adapted to convey pneumatic fluid.

20. A fastener feeding machine as set forth in claim 15, wherein:
each escapement have fastener exit tubes associated therewith configured to allow release of said fasteners; and
a plurality of manifold tubes disposed in said manifold body, with at least one manifold tube being positioned at each of said mounting stations for selective communication with the fastener exit tube of an associated escapement.

21. A fastener feeding machine as set forth in claim 15, wherein:
said escapement has a return port associated therewith to operably return said pressurized fluid to said manifold body;
a plurality of manifold ports and passageways disposed in said manifold body to receive said return pressurized fluid from said return port of said escapement, with at least one manifold port and associated passageway being positioned at each of said mounting stations for selective communication with the return port of an associated escapement; and
said return passageway for said pressurized fluid in said manifold body being positioned such that the return pressurized fluid is communicated to said fastener delivery system.

22. A fastener feeding machine as set forth in claim 15, wherein:
said manifold body has a plurality of control fluid passageways shaped to operably communicate with a source of pressurized fluid control;
a plurality of manifold ports disposed in said manifold body and communicating with said control fluid passageways, with at least one manifold port being positioned at each of said mounting stations of selective communication with the control port of an associated escapement.

23. A manifold arrangement for fastener feeding machines and the like of the type having a plurality of fluid-powered escapements, each having an inlet power port associated therewith, and being adapted to select and deliver individually fasteners to a selected workstation in a predetermined sequence and orientation; said manifold arrangement comprising:
a manifold body having a plurality of mounting stations thereon, and a central fluid supply passageway shaped to operably communicate with a source of pressurized fluid;
a plurality of manifold ports disposed in said manifold body and communicating with said central passageway, with at least one of said manifold ports being positioned at each of said mounting stations for selective communication with the power port of an associated escapement;
a plurality of fluid seals positioned about said manifold ports, and adapted to form leak-resistent seals between said manifold body and each of the escapements; and
means associated with each of said mounting stations for detachably mounting an associated escapement on said manifold body, and being configured such that physical attachment of the associated escapements to said manifold body at a selected one of said mounting stations automatically aligns the power port on the associated escapement with the manifold port at the one mounting station of said manifold body to communicate pressurized fluid therebetween, and simultaneously engages the fluid seal associated with said one mounting station to form a leak-resistent seal therebetween.

24. A fastener feeding manifold arrangement as set forth in claim 23, wherein:
said attaching means comprises a tongue and groove arrangement at one end of each of said mounting stations, and a single removable fastener at an opposite end of each of said mounting stations, such that the associated escapements are mounted on said manifold body by first engaging the associated tongue and groove at the one end of the associated escapement, and then installing the associated fastener at the opposite end of the associated escapement.

25. A fastener feeding manifold arrangement as set forth in claim 23, wherein:
said fluid seals are compressible; and
said escapement attaching means converges the associated escapement and said manifold body to compress said associated fluid seal therebetween.

26. A fastener feeding manifold arrangement as set forth in claim 23, wherein:
said manifold mounting stations have a substantially identical configuration, and are arranged generally side-by-side along said manifold body.

27. A fastener feeding manifold arrangement as set forth in claim 23, wherein:
said pressurized fluid is pneumatic.; and
said manifold ports are adapted to convey pneumatic fluid.

28. A fastener feeding manifold arrangement as set forth in claim 23, wherein:
said manifold has a plurality of manifold tubes disposed in said manifold body, with at least one manifold tube being positioned at each of said mounting stations for selective communication with the fastener exit tube of an associated escapement.

29. A manifold arrangement for a fastener feeding machine as set forth in claim 23, wherein:
said manifold has a plurality of manifold ports and passageways disposed in said manifold body to receive said return pressurized fluid from said return port of an associated escapement, with at least one manifold port and associated passageway being positioned at each of said mounting stations for selective communication with the return port of an associated escapement; and
said return passageway for said pressurized fluid in said manifold body being positioned such that the return pressurized fluid is communicated to an associated fastener delivery system.

30. A manifold arrangement for a fastener feeding machine as set forth in claim 23, wherein:

said manifold body has a plurality of control fluid passageways shaped to operably communicate with a source of pressurized fluid control; and a plurality of manifold ports disposed in said manifold body and communicating with said control fluid passageways, with at least one manifold port being positioned at each of said mounting stations for selective communication with the control port of an associated escapement.

31. A fastener feeding machine, comprising:

a plurality of escapements, each having means for selecting and delivering individual fasteners to a specified workstation in a predetermined sequence and orientation;

an escapement manifold shaped to support thereon a plurality of said escapements in a side-by-side relationship;

a quick-disconnect arrangement for removably mounting each of said escapements on said manifold, including:

a groove extending along one side of said manifold;

a tongue associated with one end of each of said escapements, and shaped for close reception in said groove;

a fastener associated with an opposite end of each of said escapements, and shaped for engagement with an opposite side of said manifold, whereby each of said escapements is quickly and securely mounted on said manifold by inserting the tongue on said escapement into the groove on said manifold, and engaging said fastener with said manifold.

32. A fastener feeding machine as set forth in claim 31, wherein:

each escapement has a fastener exit tube associated therewith configured to allow release of said fasteners; and a plurality of manifold tubes disposed in said manifold body, with at least one manifold tube being positioned at each of said mounting stations for selective communication with the fastener exit tube of an associated escapement.

* * * * *